United States Patent
Kuo et al.

(10) Patent No.: US 8,842,456 B2
(45) Date of Patent: Sep. 23, 2014

(54) ANALOG CONTROLLER FOR INVERTER

(75) Inventors: Yeong-chau Kuo, Tainan (TW); Wen-chuen Liu, Tainan (TW); Tai-haur Kuo, Tainan (TW)

(73) Assignee: National Cheng Kung University, Tainan (TW)

( * ) Notice: Subject to any disclaimer, the term of this patent is extended or adjusted under 35 U.S.C. 154(b) by 190 days.

(21) Appl. No.: 13/587,346

(22) Filed: Aug. 16, 2012

(65) Prior Publication Data

US 2013/0051106 A1  Feb. 28, 2013

(30) Foreign Application Priority Data

Aug. 23, 2011  (TW) .............................. 100130115 A

(51) Int. Cl.
*H02M 7/5387* (2007.01)
*H02J 3/38* (2006.01)
*H02M 1/42* (2007.01)
*H02M 7/42* (2006.01)

(52) U.S. Cl.
CPC .............. *H02M 7/5387* (2013.01); *Y02B 70/12* (2013.01); *H02J 3/385* (2013.01); *Y02E 10/58* (2013.01); *H02M 1/42* (2013.01); *Y10S 323/906* (2013.01)
USPC .............. 363/98; 363/131; 363/132; 323/207; 323/906

(58) Field of Classification Search
CPC ..................... H02M 3/33507; H02M 3/33523; H02M 7/53806; H02M 7/53871; H02M 7/5387; H02M 1/4225; H02J 7/35; G05F 1/67; G05F 1/70
USPC .............. 363/97, 98, 131, 132; 323/906, 205, 323/207
See application file for complete search history.

(56) References Cited

U.S. PATENT DOCUMENTS

| | | | | |
|---|---|---|---|---|
| 7,126,294 | B2 * | 10/2006 | Minami et al. ................ | 318/139 |
| 7,660,139 | B2 * | 2/2010 | Garabandic .................... | 363/98 |
| 8,189,352 | B2 * | 5/2012 | Egiziano et al. ................ | 363/35 |
| 8,405,367 | B2 * | 3/2013 | Chisenga et al. ............. | 323/207 |

* cited by examiner

*Primary Examiner* — Gary L Laxton
*Assistant Examiner* — Kevin H Sprenger
(74) *Attorney, Agent, or Firm* — Muncy, Geissler, Olds & Lowe, P.C.

(57) ABSTRACT

An analog controller is disclosed. The controller has a maximum power point tracking unit and a power factor adjusting unit. The maximum power point tracking unit generates a maximum power tracking voltage which is used to control the magnitude of the output current of the inverter so as to extract the most available power from the power generating device. The power factor adjusting unit, which generates a ramp control voltage that will further determine the duty ratio and switching frequency of PWM signal, gracefully tunes the magnitude and reduces the total harmonic distortion of the current injected from inverter into utility grid.

7 Claims, 7 Drawing Sheets

US 8,842,456 B2

ANALOG CONTROLLER FOR INVERTER

BACKGROUND OF THE INVENTION

1. Field of the Invention

The present invention concerns an analog control device, especially to an analog controller for an inverter which is fed by a power generating device with direct current and feeds the utility grid with alternate current. The power generating device, preferably solar panel, generates electricity from renewable energy sources.

2. Description of the Related Art

The output power of power generating device that captures solar or wind energy can be changed due to different environmental conditions. Therefore, maintaining optimized power conversion efficiency with stable in-phase output current of an inverter is an essential design consideration for a controller.

With reference to FIG. 7, a system diagram of a conventional two-stage solar-energy power generating apparatus is disclosed. The two-stage solar-energy power generating apparatus includes a solar panel 90, a maximum power point tracking (hereafter "MPPT") regulator 91 and an inverter 92. The MPPT regulator 91 is disposed at front stage to receive the output voltage and output current from the solar panel 90 and perform MPPT technique for the electrical output of the solar panel 90. The inverter 92 is disposed at back stage to convert the DC power processed by MPPT regulator 91 to AC power, which is then injected into utility grid. The inverter 92 is controlled by a controller 93, which adaptively adjusts the output power of the inverter 92 according to the output voltage of front stage and injects the energy captured from the front stage into utility grid to achieve unity power factor (hereafter "PF").

Perturb and observe (hereafter "P&O") algorithm is a typical MPPT method for solar-energy generating system. With reference to FIG. 8, a characteristic curve of the output power versus the output voltage of a solar panel is disclosed. In the characteristic curve, the operating region can be divided into a positive-slope area and a negative-slope area according to the maximum power point. To approach the maximum power point, the P&O algorithm intends to increase the output voltage of the solar panel when the operating point is at the positive-slope region, whereas the P&O algorithm intends to decrease the output voltage of the solar panel when the operating point is at the negative-slope region.

Because the output power of solar-energy power generating system can be influenced by environmental conditions, such as the change of temperature or solar irradiance, the MPPT regulator may be further designed with smart control techniques, such as fuzzy control and neural network techniques, to predict the optimized operating point for obtaining smooth MPPT. However, these techniques are complicated and difficult in implementation.

Conventional controllers for the inverter can be divided into digital circuit's and analog circuit's implementations. The shortcoming of using digital circuits is that the precision of the controller is limited by the number of bits of the microprocessor and is slower in response. Although the existing analog circuit's implementation achieves fast and precise control, they are implemented large in size, expensive and with complicated algorithm.

Therefore, it is necessary to provide an analog controller for an inverter to overcome the existing problems in the conventional technology.

SUMMARY OF THE INVENTION

In view of the shortcomings of the conventional technology, the main objective of the present invention is to provide an analog controller for an inverter, and the analog integrated circuit technique is suitable for this analog controller. The analog controller can receive information of output voltages and output currents of the power generating device and the utility grid, and adaptively adjust the switching frequency and conduction time of switches of the inverter according to such information to maximize the power transferring from the power generating device to the utility grid. The circuits of the present invention can be cost-effective and easy to be integrated into an inverter.

In order to achieve the foregoing object, the present invention provides an analog controller for an inverter, wherein the inverter is interfaced between a power generating device and the utility grid for being fed by the power generating device with direct current and feeding the utility grid with alternating current and has a plurality of switches. The analog controller comprises:

an MPPT unit being used to detect output voltage and output current that are outputted from the power generating device to the inverter, and to generate a MPPT voltage according to a difference between the products of the output voltage and output current of the power generating device detected at a present time and at a last time; and a PF adjusting unit being used to receive the MPPT voltage and a difference voltage between the output voltage of the power generating device and utility grid voltage, and accordingly generate a ramp control voltage; wherein the magnitude of the ramp control voltage is tuned according to the MPPT voltage so as to control the magnitude of output current of the inverter, and the frequency of the ramp control voltage is tuned based on the difference voltage so as to reduce the total harmonic distortion of the output current of the inverter.

In one embodiment of the present invention, the MPPT unit includes:

a voltage sensor being used to detect the output voltage that is outputted from the power generating device to the inverter;

a current sensor being used to detect the output current that is outputted from the power generating device to the inverter;

a power comparison module being used to respectively compute a present power value and a last power value according to the values of the output voltage and the output current of the power generating device received at the present time and at the last time, and then compare the two power values and output a control signal accordingly; and a tracking voltage generating unit being used to receive the control signal and generate the MPPT voltage according to the variation of the control signal.

In one embodiment of the present invention, the MPPT unit detects the output voltage and the output current of the power generating device with reference to a detecting period, and the detecting period equals the reciprocal of grid voltage frequency.

In one embodiment of the present invention, the power comparison module is constituted by a multiplier, a sample-and-hold device and a comparator; and the tracking voltage generating unit is constituted by a counter and a digital-to-analog converter.

In one embodiment of the present invention, the power comparison module executes comparison between the present power value and the last power value when being positive-edge triggered.

In one embodiment of the present invention, the PF adjusting unit includes an adder, a comparator and a flip-flop; the adder receives the ramp control voltage and the output current of the inverter and then outputs a summing result; the comparator receives the summing result and a grid voltage and then generates a comparison result; and the flip-flop generates a PWM signal according to the comparison result so as to output the PWM signal; wherein the duty ratio and switching frequency of the PWM signal, which is based on the magnitude and frequency of the ramp control voltage generated by the PF adjusting unit, is then sent to a gate or a base terminal of each of the switches of the inverter.

The present invention is to adaptively adjust conduction time under different irradiance and temperature for obtaining an optimized relationship between the inverter and the power generating device. With such operating principle, the output power of the power generating device can be maximally utilized, and the current injected into the utility grid can be in-phase with the utility grid voltage.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
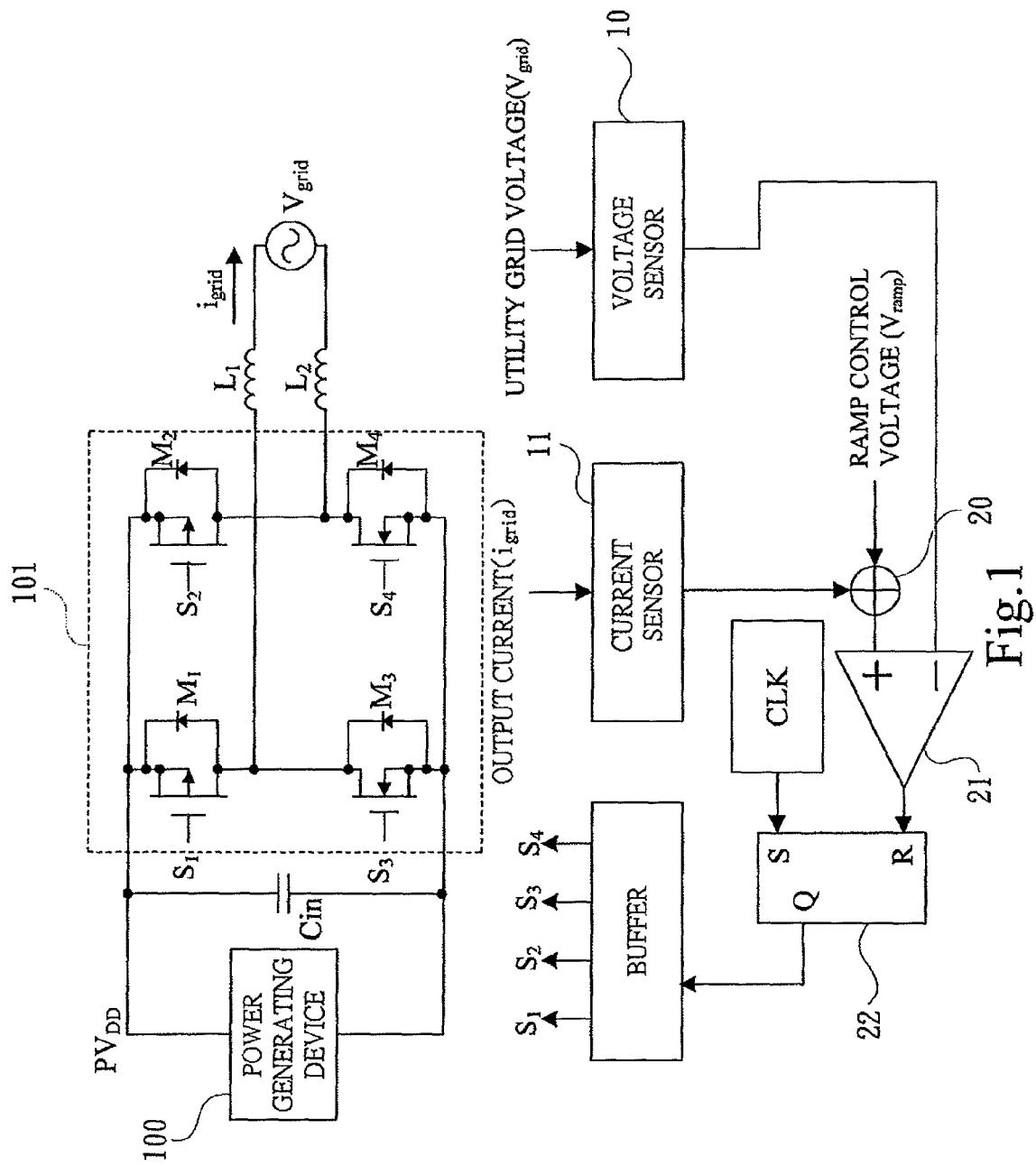
FIG. 1 schematically shows a control structure of a preferred embodiment of an analog controller for an inverter in accordance with the present invention.
Figure 2:
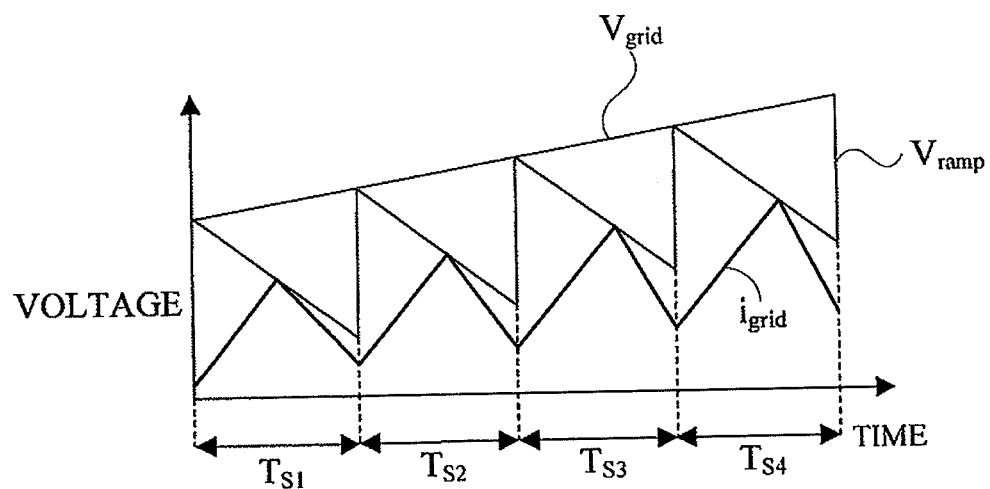
FIG. 2 shows waveforms of control signals of a preferred embodiment of the analog controller for an inverter.
Figure 3:
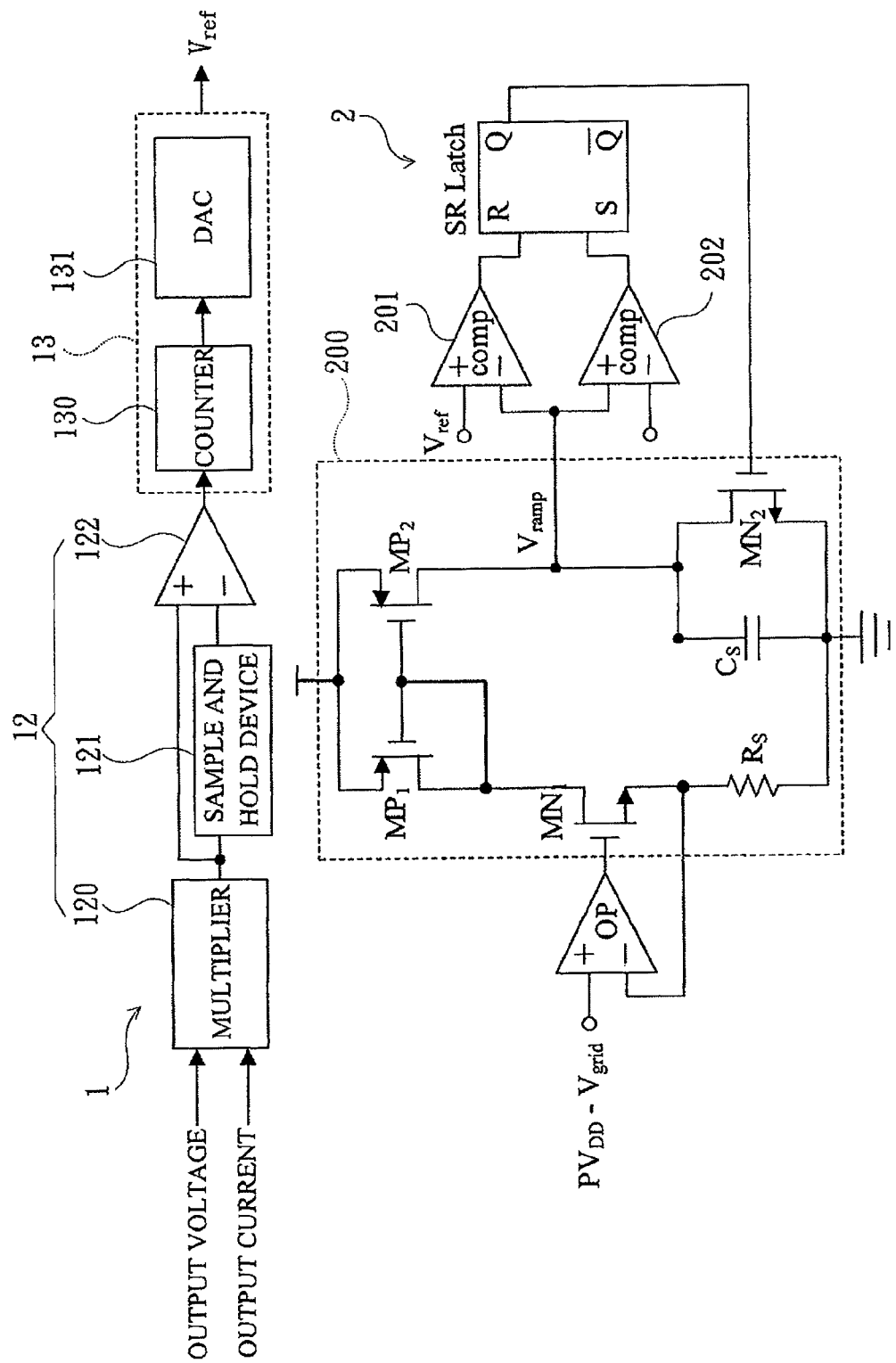
FIG. 3 schematically shows a preferred embodiment of a MPPT algorithm circuit of the analog controller for an inverter.

Please refer to FIGS. 1, 2 and 3, wherein FIG. 1 schematically shows a control structure of a preferred embodiment of an analog controller for an inverter in accordance with the present invention; FIG. 2 shows waveforms of control signals of a preferred embodiment of the analog controller for an inverter; and FIG. 3 schematically shows a preferred embodiment of a maximum power tracking (hereafter "MPPT") algorithm circuit of the analog controller for an inverter. The analog controller of the present invention controls an inverter 101 which is used to couple a power generating device 100 and utility grid. The power generating device 100 generates electricity from renewable energy which can be solar energy or wind energy. The inverter 101 is fed by the power generating device 100 with direct current and feeding the utility grid with alternating current. In this embodiment, the inverter 101 is a full-bridge type DC-to-AC inverter and has four switches S1, S2, S3 and S4. The analog controller of the present invention mainly comprises an MPPT unit 1 and a PF adjusting unit 2.

The MPPT unit 1 is used to detect output voltage and output current that are outputted from the power generating device 100 to the inverter 101, and to generate an MPPT voltage $V_{ref}$ according to a difference between the product of the output voltage and output current detected at the present time and the product of the output voltage and output current detected at the last time.

In more detail, the MPPT unit 1 mainly includes a voltage sensor 10, a current sensor 11, a power comparison module 12 and a tracking voltage generating unit 13.

The voltage sensor 10 is used to detect the output voltage that is outputted from the power generating device 100 to the inverter 101.

The current sensor 11 is used to detect the output current that is outputted from the power generating device 100 to the inverter 101.

Figure 4:
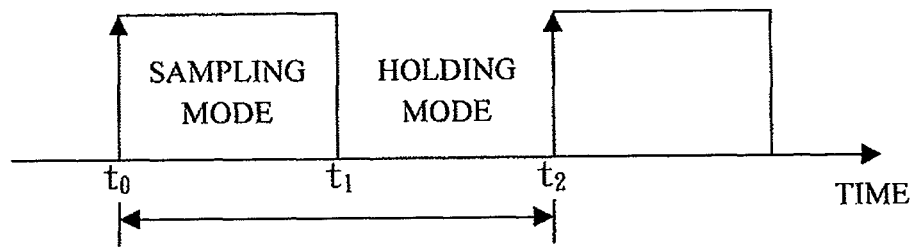
FIG. 4 is a time sequence diagram of a preferred embodiment of a sample-and-hold device of the analog controller for an inverter.

The power comparison module 12 is used to respectively compute a present power value P(t) and a last power value P(t−1) according to the value of the output voltage and the output current of the power generating device 100 received at the present time and the value of the output voltage and output current received at the last time, and then compare the present power value P(t) and the last power value P(t−1) to output a control signal accordingly. The power comparison module 12 is preferably constituted by a multiplier 120, a sample-and-hold device 121 and a comparator 122. The multiplier 120 executes multiplication of the output voltage value and the output current value of the power generating device 100 being detected at the present time and also executes multiplication of the output voltage value and the output current value being detected at the last time so as to obtain the foregoing present power value P(t) and the last power value P(t−1). The sample-and-hold device 121 is used to sample and temporarily hold the present power value P(t) and then output the last power value P(t−1) that is temporarily held last time The comparator 122 with two input terminals respectively receives the present power value P(t) and the last power value P(t−1), and then compares the two power values and then outputs a control signal. In more detail, the MPPT unit 1 detects the output voltage and the output current of the power generating device 100 with reference to a detecting period, and in this embodiment, the detecting period equals to the reciprocal of grid voltage frequency. In this embodiment, the power comparison module 12 executes the comparison between the current power value P(t) and the last power value P(t−1) when being positive-edge triggered. Furthermore, with reference to FIG. 4, FIG. 4 is a time sequence diagram of a preferred embodiment of a sample-and-hold device of the analog controller for an inverter. Take the time interval from t0 to t2 as an example, wherein during the time interval from t0 to t1, the sample-and-hold device 121 samples the current power value P(t); during the time interval from t1 to t2, the sample-and-hold device 121 holds the power value retrieved at t1. The power value being held is called P(t−1) herein. P(t) and P(t−1) will be compared at t2 as the comparator 122 is positive-edge triggered.

The tracking voltage generating unit 13 is used to receive the control signal and generate the MITT voltage $V_{ref}$ according to the variation of the control signal. In this embodiment, the tracking voltage generating unit 13 is constituted by a counter 130 and a digital-to-analog converter 131. The counter 130 receives the control signal outputted from the foregoing comparator 122 and then accordingly outputs a digital code. The counter 130 counts up or counts down the value of the digital code according to whether the control signal is at a relatively high potential or at a relatively low potential. The digital-to-analog converter 131 receives the digital code and converts the digital code to the MPPT voltage $V_{ref}$. The PF adjusting unit 2 is used to receive two voltage signals, the MPPT voltage, $V_{ref}$, and a difference voltage between output voltage of the power generating device 100 and utility grid voltage, PVDD–$V_{grid}$, and accordingly generate a ramp control voltage, $V_{ramp}$; wherein the magnitude of the ramp control voltage is tuned according to the MPPT voltage so as to control the magnitude of output current of the inverter, and the frequency of the ramp control voltage is tuned based on the difference voltage, PVDD–$V_{grid}$, so as to reduce the total harmonic distortion of the output current of the inverter.

Figure 5:
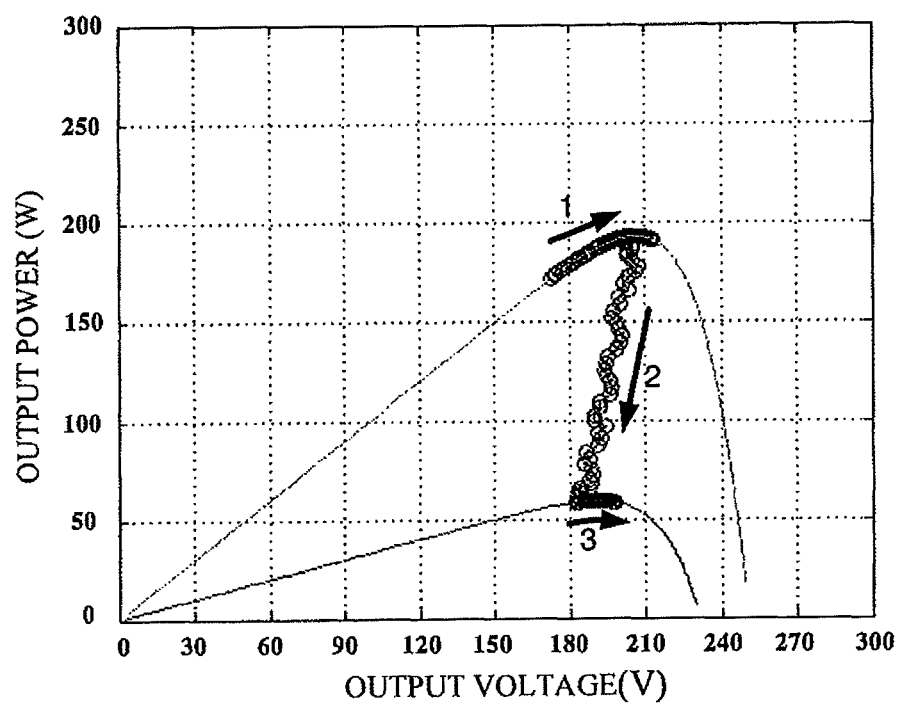
FIG. 5 is a characteristic curve of output power versus output voltage of a power generating device using a preferred embodiment of the analog controller for an inverter in accordance with the present invention.

In this embodiment, a current mirror circuit 200 is deployed by the PF adjusting unit 2 which receives the MPPT voltage, $V_{ref}$, to control the charging current onto a capacitor $C_s$, and two comparators 201, 203 are used to determine upper and lower limits of the ramp control voltage $V_{ramp}$ so as to obtain foregoing ramp control voltage $V_{ramp}$. The PF adjusting unit 2 further has an adder 20, a comparator 21 and a flip-flop 22. The adder 20 receives the ramp control voltage $V_{ramp}$ and the output current $i_{grid}$ of the inverter 101 and then outputs a summing result. The comparator 21 receives the summing result and a grid voltage $V_{grid}$ and then generates a comparison result. The flip-flop 22 generates a PWM signal according to the comparison result so as to output the PWM signal; wherein the duty ratio and switching frequency of the PWM signal, which is based on the magnitude and frequency of the ramp control voltage generated by the PF adjusting unit 2, is then sent to a gate or a base terminal of each of the switches S1 to S4 of the inverter 101. The effect of MPPT technique brought by the inverter implemented in the present invention is referred to FIG. 5. FIG. 5 is a characteristic curve of output power versus output voltage of a power generating device, a solar panel, using preferred embodiment of the analog controller for the inverter, wherein the upper curve is with solar irradiance of 600 w/m$^2$, whereas the lower curve is with solar irradiance of 200 w/m$^2$. The trajectory formed by circles shows the tracking state of the output power of the power generating device, a solar panel, wherein the tracking points (the circles) change with time is in the sequence of 1, 2 to 3. Hence, it can be understood from FIG. 5 that the present invention can effectively track the maximum output power point of the solar panel, adaptively adjust the output voltage of the solar panel and thereby keep maximally available output power from the solar panel.

Figure 6:
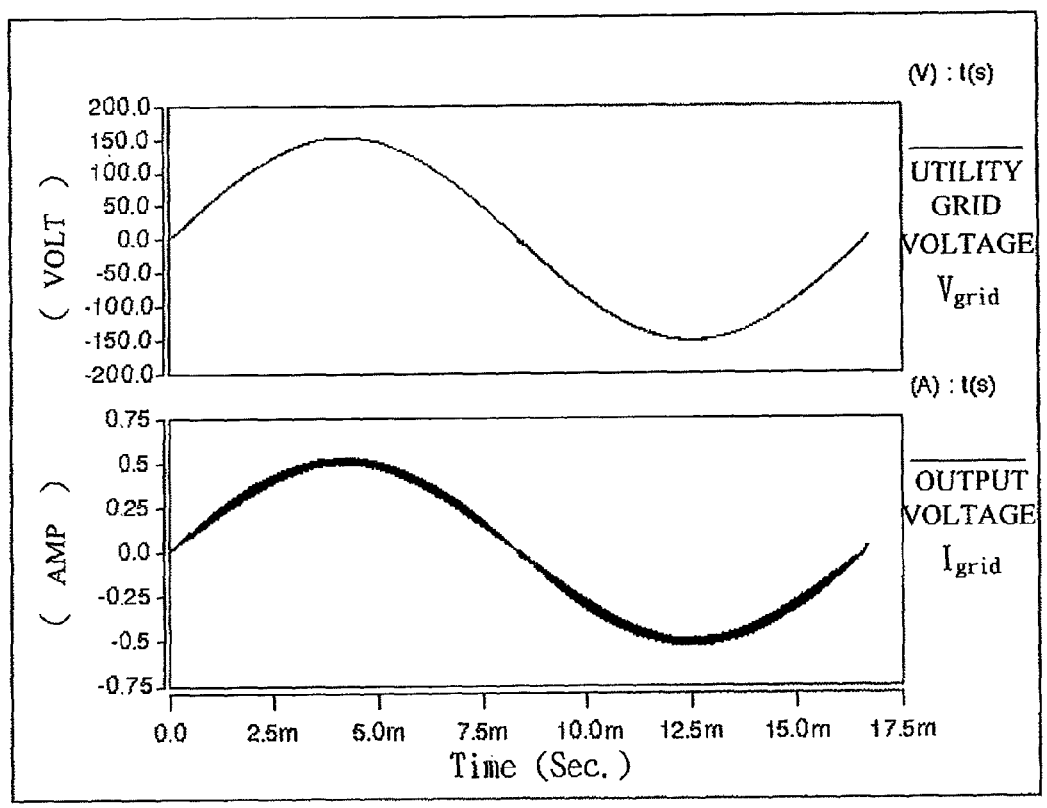
FIG. 6 shows waveforms of output voltage and output current of the inverter that is controlled by the analog controller of the present invention as the captured energy is converted and fed into the utility grid by the inverter.
Figure 7:
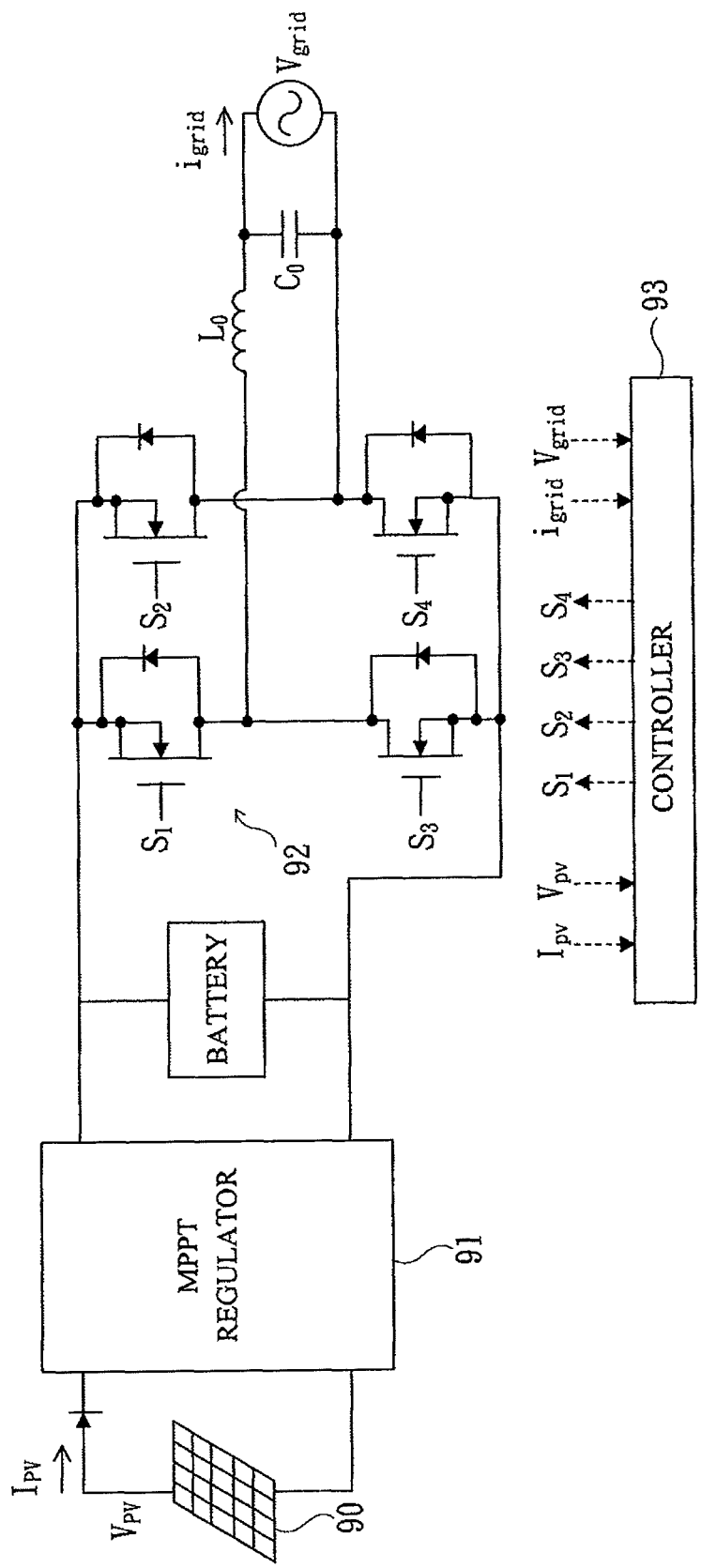
FIG. 7 is a system diagram of a conventional two-stage solar-energy power generating apparatus.
Figure 8:
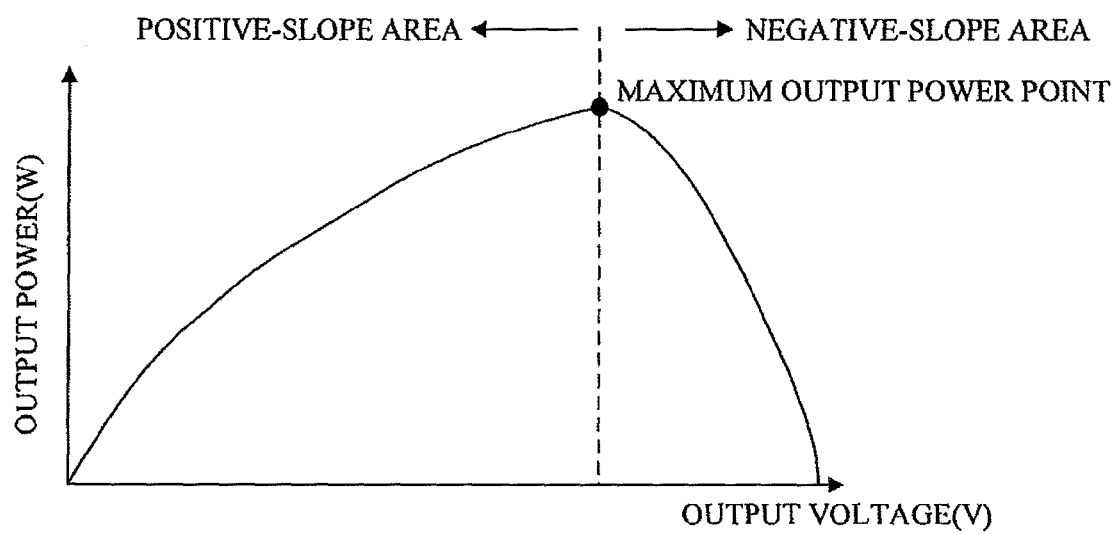
FIG. 8 is a characteristic curve of the output power versus the output voltage of a solar panel using P&O algorithm to perform maximum power point tracking.

With reference to FIGS. 6 and 2, because the detecting period equals to the reciprocal of grid voltage frequency, the ramp control voltage $V_{ramp}$ generated by the PF adjusting unit 2 has the same levels at each period of the grid voltage, $V_{grid}$, which ensures that the output current, $i_{grid}$, keeps in-phase with the grid voltage, $V_{grid}$, and can avoid harmonic distortion, and thereby obtaining high power factor at the output of inverter. Therefore, the present invention can timely feed the energy retrieved by the inverter into the utility grid for achieving near unity power factor at the output of inverter 101.

By the above description, the present invention uses a MPPT unit in conjunction with a PF adjusting unit to generate a ramp control voltage. The ramp control voltage controls the magnitude of output current of the inverter and thereby increases or decreases the output power of a solar panel for achieving MPPT. Meanwhile, the present invention also controls the output current to be in-phase with grid voltage to reduce total harmonic distortion and power loss for achieving near unity PF at the output of inverter.

The present invention has been described with a preferred embodiment thereof and it is understood that many changes and modifications to the described embodiment can be carried out without departing from the scope and the spirit of the invention that is intended to be limited only by the appended claims.

What is claimed is:

1. An analog controller for an inverter, wherein the inverter is interfaced between a power generating device and utility grid and has a plurality of switches, and the analog controller comprises:
   an MPPT unit being used to detect output voltage and output current that are outputted from the power generating device to the inverter, and to generate an MPPT voltage according to a difference between the products of the output voltage and the output current of the power generating device detected at a present time and at a last time; and
   a PF adjusting unit being used to receive the MPPT voltage and a difference voltage between the output voltage of the power generating device and utility grid voltage, and accordingly generate a ramp control voltage, wherein the magnitude of the ramp control voltage is tuned according to the MPPT voltage, and the frequency of the ramp control voltage is tuned based on the difference voltage.

2. The analog controller as claimed in claim 1, wherein the MPPT unit includes:
   a voltage sensor being used to detect the output voltage that is outputted from the power generating device to the inverter;
   a current sensor being used to detect the output current that is outputted from the power generating device to the inverter;
   a power comparison module being used to respectively compute a present power value and a last power value according to the values of the output voltage and the output current of the power generating device received at the present time and at the last time, and then compare the two power values to accordingly output a control signal; and
   a tracking voltage generating unit being used to receive the control signal and generate the MPPT voltage according to the variation of the control signal.

3. The analog controller as claimed in claim 2, wherein the MPPT unit detects the output voltage and the output current of the power generating device with reference to a detecting period, and the detecting period equals the reciprocal of grid voltage frequency.

4. The analog controller as claimed in claim 2, wherein the power comparison module is constituted by a multiplier, a sample-and-hold device and a comparator; and the tracking voltage generating unit is constituted by a counter and a digital-to-analog converter.

5. The analog controller as claimed in claim 3, wherein the power comparison module executes comparison between the present power value and the last power value when being positive-edge triggered.

6. The analog controller as claimed in claim 2, wherein the PF adjusting unit includes an adder, a comparator and a flip-flop; the adder receives the ramp control voltage and the output current of the inverter and then outputs a summing result; the comparator receives the summing result and a grid voltage and then generates a comparison result; and the flip-flop generates a PWM signal according to the comparison result, wherein the duty ratio and switching frequency of the PWM signal, which is based on the magnitude and frequency of the ramp control voltage generated by the PF adjusting unit, is then sent to a gate or a base terminal of each of the switches of the inverter.

7. The analog controller as claimed in claim 5, wherein the PF adjusting unit includes an adder, a comparator and a flip-flop; the adder receives the ramp control voltage and the output current of the inverter and then outputs a summing result; the comparator receives the summing result and a grid voltage and then generates a comparison result; and the flip-flop generates a PWM signal according to the comparison result, wherein the duty ratio and switching frequency of the PWM signal, which is based on the magnitude and frequency of the ramp control voltage generated by the PF adjusting unit, is then sent to a gate or a base terminal of each of the switches of the inverter.

\* \* \* \* \*